No. 647,277. Patented Apr. 10, 1900.
S. M. REECE.
ANIMAL POKE.
(Application filed Apr. 12, 1899.)
(No Model.)
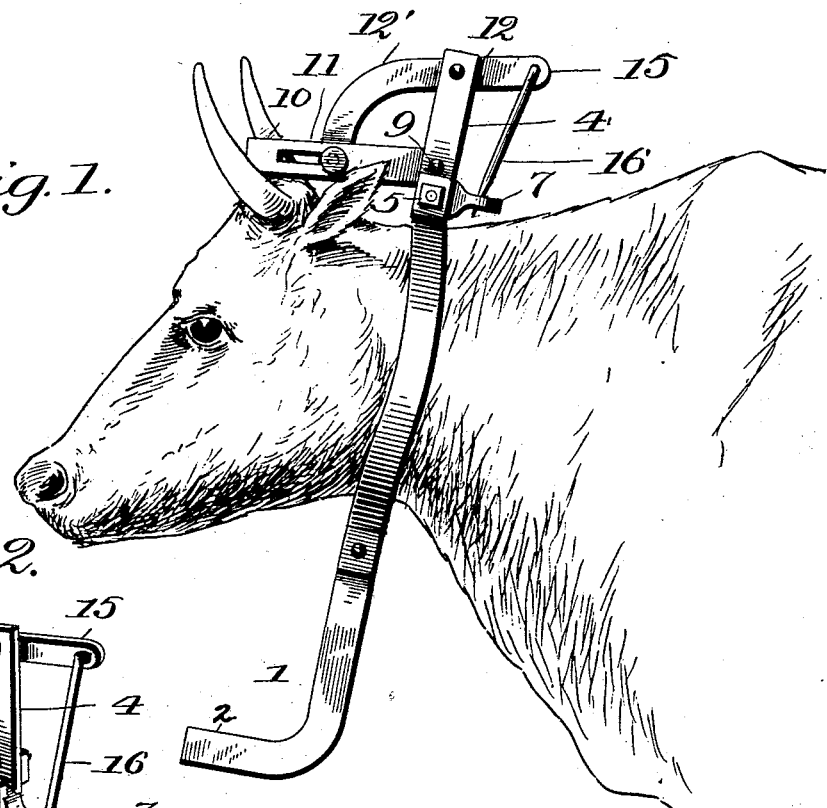
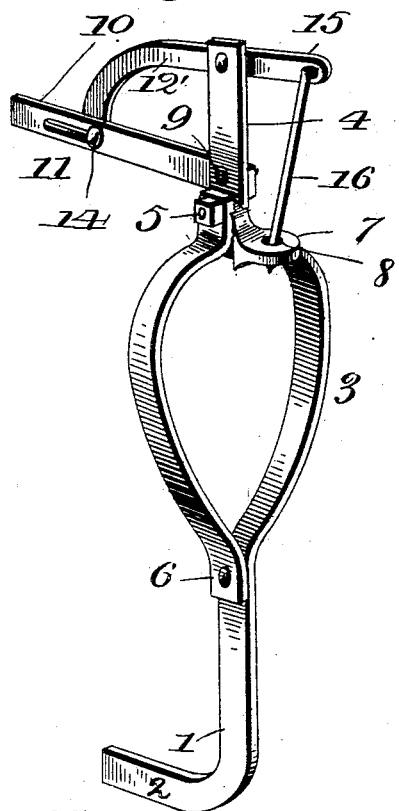
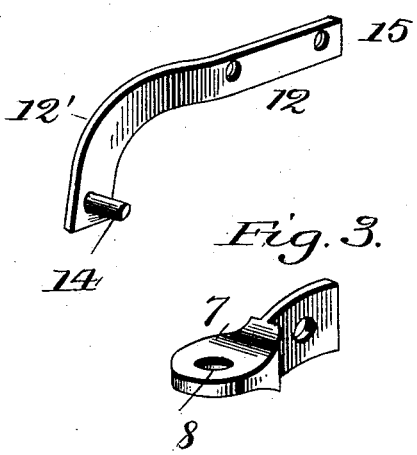
Witnesses
L. C. Hills
E. M. Hitchin
Inventor:
Stephen M. Reece,
By H. C. Evert & Co.
Attorneys

UNITED STATES PATENT OFFICE.

STEPHEN M. REECE, OF SMITH CENTRE, KANSAS.

ANIMAL-POKE.

SPECIFICATION forming part of Letters Patent No. 647,277, dated April 10, 1900.

Application filed April 12, 1899. Serial No. 712,796. (No model.)

*To all whom it may concern:*

Be it known that I, STEPHEN M. REECE, a citizen of the United States, residing at Smith Centre, in the county of Smith and State of Kansas, have invented certain new and useful Improvements in Animal-Pokes; and I do hereby declare the following to be a full, clear, and exact description of the invention, such as will enable others skilled in the art to which it appertains to make and use the same.

This invention relates to certain new and useful improvements in animal-pokes.

One of the objects of the invention is to construct a device of this character which will be extremely simple, strong, durable, and effectual in its operation.

A further object of the invention is to construct an animal-poke having a pricker so arranged as to be operated to prick or prod the animal by contact of a slotted and pivotally-mounted bar with the animal's head.

A further object of the invention is to construct an animal-poke with the stang, a portion of the neck-yoke, and the supporting-standard for the operating mechanism of a single piece of material, and thereby simplify the construction.

The device aims to prevent breachy cattle or other stock from going under wire, board, or like fences or over the same; and it consists in the novel features of construction, as will be hereinafter more specifically described and then particularly pointed out in the claims.

In describing the invention in detail reference is had to the accompanying drawings, forming a part of this specification, and wherein like figures of reference will be used to designate similar parts throughout the several views, in which—

Figure 1 is a perspective view of the device applied in position upon the animal's neck. Fig. 2 is a perspective view of my improved animal-poke. Fig. 3 is a similar view of the apertured casting which forms a guide for the pricker or needle, and Fig. 4 is a perspective view of the pivotally-mounted bar to which the pricker or needle is attached.

Referring now to the drawings by reference-numerals, 1 designates the stang, which at its lower end is bent at right angles, as shown at 2, this portion extending forwardly of the device when in its position upon the neck of the animal. The bar from which this stang 1 is formed is swelled outwardly to form one half of the neck-yoke 3, and the extending upper portion 4 of the bar is upon a plane with the stang 1 and acts as a standard for supporting the operating mechanism for the pricker or needle. The other half of the neck-yoke is formed of a curved bar of the same shape as the swell in the bar from which the stang is formed and is riveted or otherwise pivotally connected to the stang at the lower end thereof, as at 6, and to the lower end of the standard 4, as at 5. Mounted between this portion of the neck-yoke and the standard 4 by the bolt 5, that fastens the two together, is a block or casting 7, which is provided with an aperture 8 to receive the pricker or needle and act as a guide therefor.

Pivotally connected to the standard 4, as at 9, is the operating-bar 10, which extends forwardly and is provided with an oblong slot 11. Likewise pivotally connected to the standard 4 near its top is a substantially angle-shaped bar 12, the downwardly-extending arm 12' of which has secured therein a headed bolt or pin 14, which operates in the oblong slot 11 as the bar 10 is operated. The rearwardly-extending arm 15 of this angle-shaped bar has pivotally secured therein the downwardly-extending pricker or needle 16, which extends through the aperture 8 in the block or casting 7, and when the operating-bar 10 is in a horizontal line, thus having the bolt or pin at the forward end of the slot 11, the point of this needle or pricker is above the top of the yoke portion, or, in other words, is held suspended, so as not to engage the neck of the animal. When, however, the animal raises the head in order to jump, the rear end of the operating-bar is brought into contact with the head of the animal, and through the connection of the angle-shaped bar with the slotted bar the arm 15 is forced downwardly, so as to thrust the needle or pricker downwardly to engage the neck of the animal. This same operation would be caused by the animal attempting to go in under or place the head between the boards or wires of a fence, thus causing the animal to withdraw.

My improved animal-poke is preferably made from light steel or other metal possessing sufficient strength and being light enough for the animal to wear. Being thus constructed of metal, there are no parts which are liable to become broken or damaged.

In order to allow the poke to be placed readily in position upon the animal, and thereby construct the yoke of a size sufficient only to fit the neck neatly and obviate the insertion of the head through the yoke, I preferably form the fastening 5 of a bolt and nut. When this nut is removed, the portion of the yoke secured thereby and by the rivet 6 may be swung around on its pivot, the yoke placed upon the neck of the animal, and when in position the parts again fastened by the bolt and nut, which will securely hold the same in position. This construction does not necessitate the enlarging of the yoke portion in order that the head of the animal may be inserted through the same, as in some devices of this character; but the yoke fitting the neck neatly the same is securely held in position upon the animal.

It will be observed, of course, that various changes may be made in the details of construction of my improved poke without departing from the general spirit of my invention.

Having fully described my invention, what I claim as new, and desire to secure by Letters Patent, is—

1. An animal-poke consisting of a stang, a neck-yoke and a vertical standard formed integral with the stang, an angle-shaped bar pivotally connected to said standard, a pricker or needle pivotally connected to said angle-shaped bar, and means connected to said bar and to the standard for operating the pricker or needle, substantially as described.

2. In an animal-poke, a neck portion, a stang, a vertical standard, a slotted operating-bar pivotally connected to said standard, an angle-shaped bar pivotally connected to the standard and to the slotted operating-bar, and a needle or pricker carried by said angle-shaped bar, substantially as described.

3. In an animal-poke, a stang having a part of the yoke and a vertical standard formed integral therewith, a bar pivotally connected to said standard, a needle carried by said bar, a guide carried by the yoke to receive said needle, and means connected to said standard and bar for operating the needle, substantially as described.

4. In an animal-poke, a stang, a yoke and a vertical standard, a needle or pricker supported from said standard, and means connected to the standard and arranged above and close to the animal's head whereby it is adapted to contact with the head of the animal for operating said needle, substantially as described.

5. In an animal-poke, a yoke formed in two pieces, one of which is movable, combined with a standard carried by the yoke, a needle or pricker pivotally supported from the standard, and means connected thereto and arranged above and close to the head of the animal whereby it is adapted to operate the needle or pricker by contact with the head of the animal, substantially as described.

6. In an animal-poke, the combination of the yoke and the pivotally-supported needle or pricker, of means arranged above and close to the animal's head for operating said needle or pricker through contact with the head of the animal, substantially as described.

7. In an animal-poke, the combination of the yoke and the pivotally-supported needle or pricker, of an operating-bar connected thereto and located close to and above the animal's head, whereby it is adapted to contact with the head of the animal at its one end and operate said needle or pricker, substantially as described.

In testimony whereof I affix my signature in presence of two witnesses.

STEPHEN M. REECE.

Witnesses:
L. C. UHL,
CHAS. S. UHL.